United States Patent
Rodrigues Pereira et al.

(10) Patent No.: US 11,216,980 B2
(45) Date of Patent: Jan. 4, 2022

(54) METHOD AND DEVICE FOR COLOR SIMILARITY EVALUATION

(71) Applicant: INESC TEC—INSTITUTO DE ENGENHARIA DE SISTEMAS E COMPUTADORES, TECNOLOGIA E CIENCIA, Oporto (PT)

(72) Inventors: Américo José Rodrigues Pereira, Vila Nova de Famalicão (PT); Pedro Miguel Machado Soares Carvalho, Guimaraes (PT); Luís António Pereira Meneses Corte Real, Oporto (PT)

(73) Assignee: INESC TEC—INSTITUTO DE ENGENHARIA DE SISTEMAS E COMPUTADORES, TECNOLOGIA E CIÊNCIA, Oporto (PT)

( * ) Notice: Subject to any disclaimer, the term of this patent is extended or adjusted under 35 U.S.C. 154(b) by 102 days.

(21) Appl. No.: 16/477,231

(22) PCT Filed: Jan. 11, 2018

(86) PCT No.: PCT/IB2018/050184
§ 371 (c)(1),
(2) Date: Jul. 11, 2019

(87) PCT Pub. No.: WO2018/130969
PCT Pub. Date: Jul. 19, 2018

(65) Prior Publication Data
US 2021/0134014 A1    May 6, 2021

(30) Foreign Application Priority Data

Jan. 11, 2017 (PT) .......................................... 109847
Jan. 17, 2017 (EP) ...................................... 17151878

(51) Int. Cl.
G06K 9/00 (2006.01)
G06T 7/90 (2017.01)
G06K 9/62 (2006.01)

(52) U.S. Cl.
CPC .............. G06T 7/90 (2017.01); G06K 9/6215 (2013.01); *G06T 2207/20024* (2013.01); *G06T 2207/20224* (2013.01)

(58) Field of Classification Search
CPC ....... H04N 19/00024; H04N 19/00139; H04N 19/00315; H04N 19/00448; H04N 9/646;
(Continued)

(56) References Cited

U.S. PATENT DOCUMENTS 10,387,746 B2 *  8/2019  Carney ................... G01J 3/462
2005/0248783 A1   11/2005  Tin
(Continued)

OTHER PUBLICATIONS

Gómez-Polo et al., "Comparison of the CIELab and CIEDE2000 color difference formulas", The Journal of Prosthetic Dentistry, vol. 115, Issue 1, Jan. 2016, pp. 65-70 (Year: 2016).*
(Continued)

*Primary Examiner* — Duy M Dang
(74) *Attorney, Agent, or Firm* — Leason Ellis LLP (57) ABSTRACT

Method and device configured for color similarity evaluation between a first and a second color, comprising the steps of: calculating one or more filters from said first and second colors; determining that the first and second colors are dissimilar if at least one of the calculated filters is above a threshold predetermined for each filter; otherwise, calculating the CIEDE2000 color-difference and determining that the first and second colors are dissimilar if the calculated CIEDE2000 color-difference is above a predetermined threshold; otherwise, determining that they are similar. A module filter may calculate the module of the difference vector between the first and second colors represented as 3D
(Continued)

coordinates in the RGB color space, the angle between the two vectors of the first and second colors represented as 3D coordinates in the RGB color space, or the lightness difference between the first and second colors in the CIELAB color space.

20 Claims, 8 Drawing Sheets (58) Field of Classification Search
CPC .... H04N 9/0451; H04N 17/002; H04N 17/02; H04N 1/40012; H04N 1/40018; H04N 1/40025; H04N 1/40031; H04N 1/40037; H04N 1/40043; H04N 1/4005; H04N 1/40056; H04N 1/40062; H04N 1/40068; H04N 1/40075; G06T 7/90; G06T 2207/20024; G06T 2207/20224; G06K 9/6215
See application file for complete search history.

(56) References Cited

U.S. PATENT DOCUMENTS

| 2015/0221077 A1* | 8/2015 | Kawabata | G06T 7/337 382/141 |
| 2018/0114343 A1* | 4/2018 | Mitchell | G06K 9/6267 |

OTHER PUBLICATIONS

Garrett M Johnson, "Measuring Images: Differences, Quality and Appearance", Dissertation,, (Mar. 1, 2003), pp. 1-166, XP002444668.

Androutsos D et al, "Distance measures for color image retrieval", Image Processing, 1998. ICIP 98. Proceedings. 1998 International Conference on Chicago, IL, USA Oct. 4-7, 1998, Los Alamitos, CA, USA,IEEE Comput. Soc, US, (Oct. 4, 1998), vol. 2, doi: 10.1109/ICIP.1998.723652, ISBN 978-0-8186-8821-8, pp. 770-774, XP010308552.

Griffin, Gregory and Holub, Alex and Perona, Pietro. Caltech-256 object category dataset. 2007, 20 pages.

Liaw, Andy and Wiener, Matthew. Classification and regression by randomForest. R news, vol. 2/3, pp. 18-22, Dec. 2002, ISSN 1609-3631.

Luo, M Ronnier and Cui, Guihua and Rigg, B. The development of the CIE 2000 colour-difference formula: CIEDE2000. Color Research & Application, 26(5):340-350, 2001.

Schwarz, Sebastian and Sjöström, Mårten and Olsson, Roger. Improved edge detection for EWOC depth upscaling. 2012 19th International Conference on Systems, Signals and Image Processing (IWSSIP), 4 pages, Apr. 11-13, 2012. IEEE.

Color Names Supported by All Browsers, http://www.w3schools.com/colors/colors_names.asp. [Online; accessed Aug. 4, 2016], 9 pages.

Dang-Nguyen, Duc-Tien and Pasquini, Cecilia and Conotter, Valentina and Boato, Giulia. RAISE: a raw images dataset for digital image forensics. Proceedings of the 6th ACM Multimedia Systems Conference, pp. 219-224, Mar. 18-20, 2015. ACM.

Pecho, Oscar E and Ghinea, Razvan and Alessandretti, Rodrigo and Pérez, Mara M and Della Bona, Alvaro. Visual and instrumental shade matching using CIELAB and CIEDE2000 color difference formulas. Dental Materials, 32(1):82-92, 2016.

Written Opinion of the ISA, PCT/IB2018/050184, 10 pages.

* cited by examiner (a) $\Delta E_{00}$ threshold = 3

(b) $\Delta E_{00}$ threshold = 5

(c) $\Delta E_{00}$ threshold = 10

Fig. 1

(a) $\Delta E_{00}$ threshold = 3

(b) $\Delta E_{00}$ threshold = 5

(c) $\Delta E_{00}$ threshold = 10

Fig. 2

(a) $\Delta E_{00}$ threshold = 3

(b) $\Delta E_{00}$ threshold = 5

(c) $\Delta E_{00}$ threshold = 10

Fig. 3

(a) $\Delta E_{00}$ vs. Module thresholds (b) $\Delta E_{00}$ vs. Angle thresholds (c) $\Delta E_{00}$ vs. Lightness thresholds

Fig. 4

(a) $\Delta E_{00}$ vs. Module thresholds (b) $\Delta E_{00}$ vs. Angle thresholds (c) $\Delta E_{00}$ vs. Lightness thresholds

METHOD AND DEVICE FOR COLOR SIMILARITY EVALUATION

CROSS-REFERENCE TO RELATED APPLICATIONS

This application is a U.S. National Stage Application under 35 U.S.C. § 371 of International Patent Application No. PCT/IB2018/050184, filed Jan. 11, 2018, which claims priority to European Application No. 17151878.0, filed Jan. 17, 2017 and Portugal Application No. 109847, filed Jan. 11, 2017, which are hereby incorporated by reference in their respective entireties.

TECHNICAL FIELD

The present disclosure relates to a method and device for color similarity evaluation, namely comparing two colors, applicable to areas such as digital image processing or computer vision.

BACKGROUND

Color differences are of great importance in many applications, particularly when image processing or computer vision techniques are to be employed. Examples of such application topics are mineral identification, dental ceramics, wine color analysis, corrosion detection and, in a more generic field, image segmentation. The latter is widely used and often a critical step in image and video processing algorithms. The noise in the outcome of this step affects the results of the following processing, namely in segmentation, detection or appearance matching, possibly preventing a proper operation. Despite the many years of research, image segmentation is still an unresolved research topic, with color identification playing a key role. The CIEDE2000 [3] metric was recommended by CIE in 2000 for industrial color difference evaluation. However, its benefits have been impaired by the computational cost.

The CIEDE2000 [3] formulation has been as an international standard since 2014, which hereby is incorporated by reference in its entirety and in particular in its calculation of color differences, with reference ISO CIE 11664-6:2014 (CIE S 014-6/E:2013), and has a strong focus on industry applications. This metric has been receiving increased attention, showing high potential in discriminating between colors, especially those with higher similarity. Using the CIEDE2000 [3] metric ($\Delta E_{00}$) allows to quantify how humans perceive the difference between two colors. Nevertheless, its wider usage has been impaired due to the high computation cost, which prevents its application in many scenarios, particularly those with real time constraints. Even though the technological evolution has enabled higher computation capabilities, there is a large number of scenarios that remain unfeasible due to the high quantities of visual information or restricted hardware.

Color based algorithms can be severely affected by illumination and the discrimination between closer colors is rarely easy. The CIEDE2000 metric has been increasingly used in many applications, enabling a coarser or finer discrimination based on the metric threshold that is selected. The $\Delta E_{00}$ color difference formula was designed so as to characterize the perceptual color difference that humans have and can be summarized by equations 1 to 28:

$$\Delta E_{00} = \sqrt{t_1^2 + t_2^2 + t_3^2 + R_T \times t_2 \times t_3} \tag{1}$$

$$t_1 = \left(\frac{\Delta L'}{K_L S_L}\right) \tag{2}$$

$$t_2 = \left(\frac{\Delta C'}{K_C S_C}\right) \tag{3}$$

$$t_3 = \left(\frac{\Delta H'}{K_H S_H}\right) \tag{4}$$

$$C_1 = \sqrt{a_1^2 + b_1^2} \tag{5}$$

$$C_2 = \sqrt{a_2^2 + b_2^2} \tag{6}$$

$$\overline{L'} = \frac{L_1 + L_2}{2} \tag{7}$$

$$\overline{C} = \frac{C_1 + C_2}{2} \tag{8}$$

$$G = \frac{1 - \sqrt{\frac{\overline{C}^7}{\overline{C}^7 + 25^7}}}{2} \tag{9}$$

$$a_{1'} = a_1(1 + G) \tag{20}$$

$$a_{2'} = a_2(1 + G) \tag{31}$$

$$C_{1'} = \sqrt{a_{1'}^2 + b_{1'}^2} \tag{42}$$

$$C_{2'} = \sqrt{a_{2'}^2 + b_{2'}^2} \tag{53}$$

$$\overline{C}' = \frac{C_{1'} + C_{2'}}{2} \tag{64}$$

$$h_{1'} = \begin{cases} \tan^{-1}\left(\frac{b_1}{a_{1'}}\right) & \text{if} \tan^{-1}\left(\frac{b_1}{a_{1'}}\right) \geq 0 \\ \tan^{-1}\left(\frac{b_1}{a_{1'}}\right) + 360° & \text{otherwise} \end{cases} \tag{75}$$

$$h_{2'} = \begin{cases} \tan^{-1}\left(\frac{b_2}{a_{2'}}\right) & \text{if} \tan^{-1}\left(\frac{b_2}{a_{2'}}\right) \geq 0 \\ \tan^{-1}\left(\frac{b_2}{a_{2'}}\right) + 360° & \text{otherwise} \end{cases} \tag{86}$$

$$\overline{H}' = \begin{cases} \frac{h_{1'} + h_{2'} + 360°}{2} & \text{if} |h_{1'} + h_{2'}| > 180° \\ \frac{h_{1'} + h_{2'}}{2} & \text{otherwise} \end{cases} \tag{97}$$

$$T = 1 - 0.17\cos(\overline{H}' - 30) + 0.24\cos(2\overline{H}') + 0.32\cos(3\overline{H}' + 6) - 0.2\cos(4\overline{H}' - 63) \tag{108}$$

$$\Delta h' = \begin{cases} h_{2'} - h_{1'} & \text{if} |h_{2'} - h_{1'}| \leq 180° \\ h_{2'} - h_{1'} + 360 & \text{if} |h_{2'} - h_{1'}| > 180; h_{2'} \leq h_{1'} \\ h_{2'} - h_{1'} - 360 & \text{if} |h_{2'} - h_{1'}| > 180; h_{2'} > h_{1'} \end{cases} \tag{119}$$

$$\Delta L' = L_2 - L_1 \tag{20}$$

$$\Delta C' = C_{2'} - C_{1'} \tag{21}$$

$$\Delta H' = 2\sqrt{C_{1'}C_{2'}} \sin\left(\frac{\Delta h'}{2}\right) \tag{22}$$

$$S_L = 1 + \frac{0.015(\overline{L}' - 50)^2}{\sqrt{20 + (\overline{L}' - 50)^2}} \tag{23}$$

$$S_C = 1 + 0.045\overline{C}' \tag{24}$$

$$S_H = 1 + 0.015\overline{C}'T \tag{25}$$

$$R_T = -R_C \sin(2\Delta\theta) \tag{26}$$

$$R_C = 2\sqrt{\frac{\overline{C}'^7}{\overline{C}'^7 + 25^7}} \tag{27}$$

$$\Delta\theta = 30\exp\left\{-\left(\frac{\overline{H}' - 275}{25}\right)^2\right\}, \tag{28}$$

where $K_L$, $K_C$ and $K_H$ are correction factors related to Lightness, Chroma and Hue, respectively. In our experiments these values were set to 1 as defined in the CIE standard. The $S_L$, $S_C$ and $S_H$ parameters are weighting factors; $\Delta L'$, $\Delta C'$ and $\Delta H'$ are the Lightness, Chroma and Hue differences. $L_1$, $a_1$, $b_1$ and $L_2$, $a_2$, $b_2$ are two colors in the CIELAB color space, with ISO 11664-4:2008 (CIE S 014-4/E:2007).

The edge detection methodology presented in [4] combined edge maps from different sources in order to upscale depth information with limited spatial resolution. Some alternatives were shown and the one that provided the best results was comprised of a combination of edge maps for intensity and color difference. The color difference edge map was obtained by usage of the CIEDE2000 color difference, in order to obtain a perceptual color edge detection that follows the characteristics of the human visual system. Although this solution provided the best results, it had the cost of a high computational complexity. For color similarity decisions using $\Delta E_{00}$, values equal or bellow 3 are typically applied; for values above 10, two colors are considered to be very different.

The CIEDE2000 [3] metric has other concurrent metrics, namely other metrics proposed by CIE like, CIE76 (also know as DeltaE CIELAB), CIE94 and DeltaE CMC. Nevertheless, several studies have concluded that more robust results can be obtained by employing $\Delta E_{00}$ even with the default parameters. Better results may be obtained by tuning formula factors to a given application characteristics.

These facts are disclosed in order to illustrate the technical problem addressed by the present disclosure.

REFERENCES

[1] Griffin, Gregory and Holub, Alex and Perona, Pietro. Caltech-256 object category dataset. 2007.

[2] Liaw, Andy and Wiener, Matthew. Classification and regression by randomForest. *R news*, 2(3):18-22, 2002.

[3] Luo, M Ronnier and Cui, Guihua and Rigg, B. The development of the CIE 2000 colour-difference formula: CIEDE2000. *Color Research & Application*, 26(5):340-350, 2001.

[4] Schwarz, Sebastian and Sjöström, Mårten and Olsson, Roger. Improved edge detection for EWOC depth upscaling. 2012 19th *International Conference on Systems, Signals and Image Processing* (IWSSIP), pages 1-4, 2012. IEEE.

[5] Color Names Supported by All Browsers. http://www.w3schools.com/colors/colors_names.asp. [Online; accessed 08-04-2016].

[6] Dang-Nguyen, Duc-Tien and Pasquini, Cecilia and Conotter, Valentina and Boato, Giulia. RAISE: a raw images dataset for digital image forensics. *Proceedings of the 6th ACM Multimedia Systems Conference*, pages 219-224, 2015. ACM.

[7] Pecho, Oscar E and Ghinea, Razvan and Alessandretti, Rodrigo and Perez, Mara M and Della Bona, Alvaro. Visual and instrumental shade matching using CIELAB and CIEDE2000 color difference formulas. *Dental Materials*, 32(1):82-92, 2016.

General Description

The important benefits of the $\Delta E_{00}$ metric are often impaired by its complexity. By analyzing the $\Delta E_{00}$ formula (presented above and described in detail in [3]), the high complexity of several of the terms is noticeable, resulting in a formula with a large computational cost. Hence, the use of this technique in many application scenarios is often unfeasible, particularly when the computational resources are more limited. Moreover, applications that need to perform multiple $\Delta E_{00}$ calculations will be seriously affected with high computation times. As an example, consider two images with resolutions 720×480 and 1920×1080 pixels; in the former one will have to process $0.3 \times 10^6$ pixels and in the latter $2.1 \times 10^6$, resulting in much more calculations. The drawback of the computing cost of $\Delta E_{00}$ becomes even more evident when considering video—with several images per second—and the increasingly penetrating 4K and 8K image resolutions. To overcome this problem and widen the applicability of this formula and its benefits to more scenarios, it is disclosed a method and device for a significantly faster decision on color similarity, while retaining the $\Delta E_{00}$ benefits and capabilities.

To decrease the computation times, the disclosed method and device apply a set of filtering modules where simpler calculations are performed and an assessment is made: (1) the two input colors are different and no further calculations are needed; (2) a decision can not be made with certainty and further analysis is required. Generically, when comparing a pair of colors, these will be an input to the modules and $\Delta E_{00}$ will only be fully computed for pairs that may have higher perceptual similarity and did not had a decision made by the lighter weight modules. Hence, the number of times the full $\Delta E_{00}$ metric is calculated, and consequently the total number of operations required, is effectively reduced, resulting in lower processing times, while maintaining the same accuracy. This is supported by the fact that the expected outcome is not a precise distance measure, but a decision on the similarity or not of a pair of colors. Nevertheless, it is still necessary to identify and establish relations between the filtering modules and $\Delta E_{00}$ so that the results are equal to the ones obtained by only applying $\Delta E_{00}$, thus maintaining the metric benefits.

Colors are often represented in the RGB color space. This is particularly true when dealing with images, which are typically acquired in the RGB color space. Since the $\Delta E_{00}$ metric makes use of the CIELAB color space, it often requires an additional color conversion step, resulting in extra calculations. It is advantageous for the filtering modules to avoid color space conversions as much as possible, more specifically, that they operate on the RGB color space. This space can be represented as a cube; hence, the difference between two colors can be seen as a difference vector inside the space. With this insight, disclosed method and device put forward three properties to be explored: the module of the difference vector between two colors; the angle between two color vectors; the lightness dissimilarity of the colors. Unlike the first two, the latter is not computed in the RGB space, requiring a color conversion (for example, converting to CIELAB lightness using CIELAB-CIEXYZ conversion and system values from standard ITU-R BT.709-6, as detailed below). Throughout the remainder of this document these properties will be referred to as Module, Angle and Lightness, respectively.

Given two colors in RGB, $C_1 = \langle r_1, g_1, b_1 \rangle$ and $C_2 = \langle r_2, g_2, b_2 \rangle$, the Angle, Module and Lightness properties are calculated as follows:

$$\text{Angle}(C_1, C_2) = \arccos\left(\frac{C_1 \cdot C_2}{\|C_1\| \times \|C_2\|}\right) \qquad (29)$$

$$\text{Module}(C_1, C_2) = \|C_2 - C_1\| \qquad (30)$$

$$\text{Lightness}(C_1, C_2) = \Delta L \qquad (31)$$

$\Delta L$ is given by the following equations, $$C_{1''} = \begin{cases} \left(\frac{C_{1'} + 0.055}{1.055}\right)^{2.4} \times 100, & \text{if } C_{1'} > 0.04045 \\ \frac{C_{1'}}{12.92} * 100, & \text{otherwise} \end{cases} \qquad (32)$$

$$C_{2''} = \begin{cases} \left(\frac{C_{2'} + 0.055}{1.055}\right)^{2.4} \times 100, & \text{if } C_{2'} > 0.04045 \\ \frac{C_{2'}}{12.92} * 100, & \text{otherwise} \end{cases} \qquad (33)$$

$$Y_1 = \frac{C_{1''} \cdot \langle 0.2126, 0.7152, 0.0722 \rangle}{100} \qquad (34)$$

$$Y_2 = \frac{C_{2''} \cdot \langle 0.2126, 0.7152, 0.0722 \rangle}{100} \qquad (35)$$

$$Y_{1'} = \begin{cases} Y_1^{\frac{1}{3}}, & \text{if } Y_1 > 0.008856 \\ 7.787 \times Y_1 + \frac{16}{116}, & \text{otherwise} \end{cases} \qquad (36)$$

$$Y_{2'} = \begin{cases} Y_2^{\frac{1}{3}}, & \text{if } Y_2 > 0.008856 \\ 7.787 \times Y_2 + \frac{16}{116}, & \text{otherwise} \end{cases} \qquad (37)$$

$$L1 = (116 \times Y_{1'}) - 16 \qquad (38)$$

$$L2 = (116 \times Y_{2'}) - 16 \qquad (39)$$

$$\Delta L = (L2 - L1), \qquad (40)$$

where $C'_1$ and $C'_2$ the normalized color vectors.

The calculations on equations 32 and 33 are performed on each component of the vectors and are here presented in a vectorized form. The referred properties have well defined limits: the angle between two color vectors (in the RGB color space) is limited between 0 and 90 degrees; the difference vector is limited by 0 as lower limit, if the vectors are equal, and 441.673 if they are on opposing vertices of the cube; the difference of lightness is limited by 0 and 100. The usage of these properties is justified by: (1) their simplicity, especially when compared to $\Delta E_{00}$ as can be observed in equations 1 to 28; (2) their well defined limits.

If a certain maximum threshold of $\Delta E_{00}$ is set, i.e., if we define a value of $\Delta E_{00}$ above which two colors are considered to be perceptually different, then it is possible to reduce the number of calculations made for colors that are expected to give a color difference higher than the defined limit, by thresholding the Angle, Module and Lightness. Therefore, it is necessary to identify relations of Angle, Module and Lightness and the different outcomes of the $\Delta E_{00}$ metric. To understand such relations and the variability of the many parameters of $\Delta E_{00}$, a set of approximately 5 million colors were used and differences calculated using data from the images present in the Caltech 256 [1] dataset as basis pixels.

Figure 1:
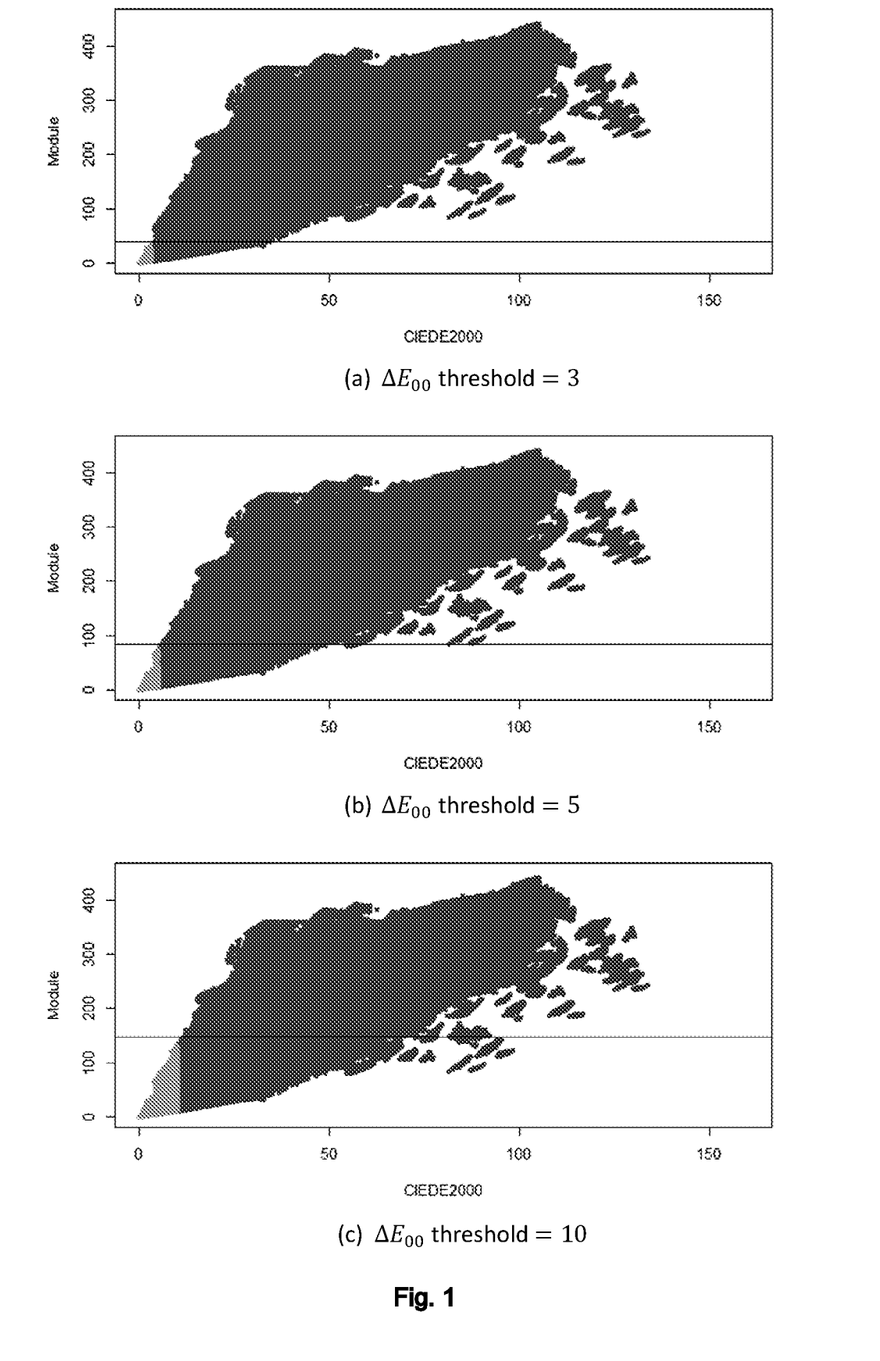
FIG. 1: Schematic representation of relationships between results of color differences using $\Delta E_{00}$ and the corresponding value obtained by Module. In dark gray $\Delta E_{00}$ values above the threshold and in light gray values below or equal to the threshold. The horizontal line represents a suggested threshold for Module.
Figure 2:
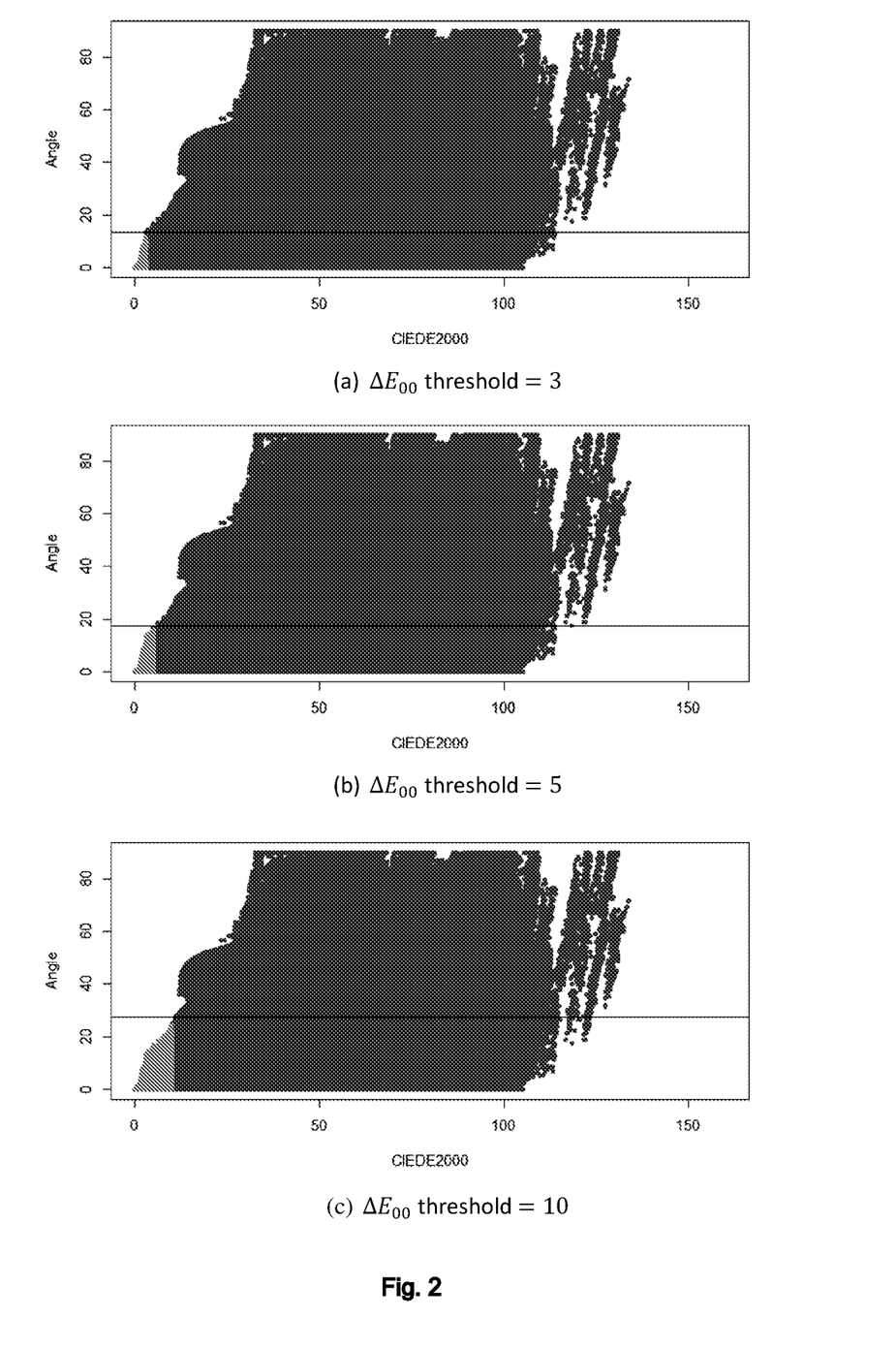
FIG. 2: Schematic representation of relationships between results of color differences using $\Delta E_{00}$ and the corresponding value obtained by Angle. In dark gray $\Delta E_{00}$ values above the threshold and in light gray values below or equal to the threshold. The horizontal line represents a suggested threshold for Angle.
Figure 3:
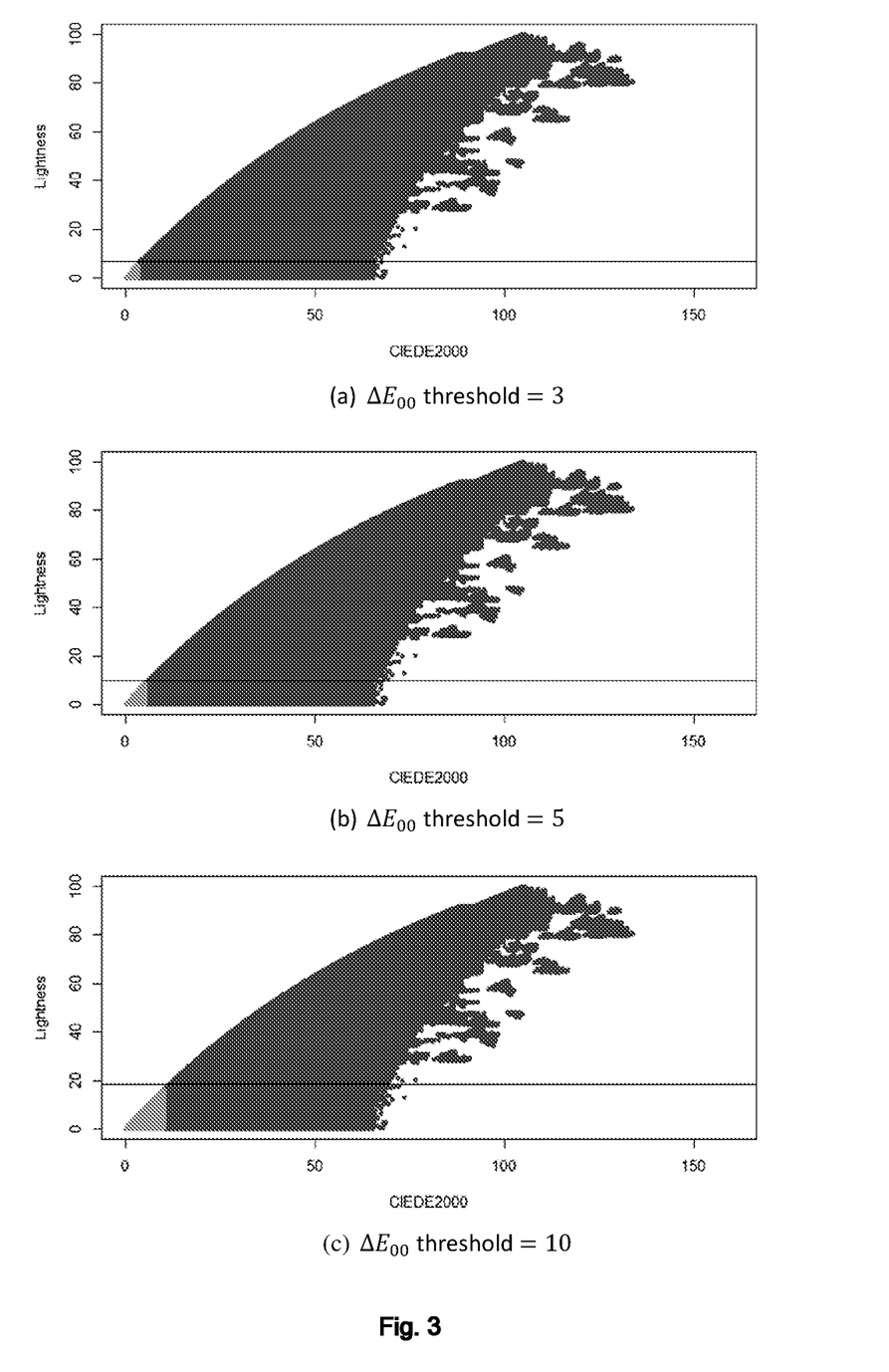
FIG. 3: Schematic representation of relationships between results of color differences using $\Delta E_{00}$ and the corresponding value obtained by Lightness. In dark gray $\Delta E_{00}$ values above the threshold and in light gray values below or equal to the threshold. The horizontal line represents a suggested threshold for Lightness.

FIGS. 1, 2 and 3 depict the relation of $\Delta E_{00}$ with Module, Angle and Lightness respectively. For each pair of colors, different $\Delta E_{00}$ thresholds were considered, namely 3, 5 and 10. Color differences above the thresholds are represented in dark gray and in light gray otherwise. Moreover, the corresponding thresholds for Module, Angle and Luminance are represented by a horizontal line. It guarantees that all pairs whose $\Delta E_{00}$ value is bellow the specified threshold are also below the Module, Angle and Lightness thresholds. As can be observed, for values below the horizontal line a confident decision based on the filtering modules can not be made and additional calculations are required. FIGS. 1, 2 and 3 show that for values of Module, Angle and Lightness above the horizontal line a decision can be accurately made on their dissimilarity, i.e., they can be classified as different using only the proposed filtering properties. Moreover, the graphics show that increasing the decision value defined for $\Delta E_{00}$ requires higher values for the thresholds of Module, Angle and Lightness. Nevertheless, the number of color differences that can be filtered is always very significant. Note that $\Delta E_{00}$ values above 7 are considered to represent clear color differences.

It is disclosed a method for color similarity evaluation between a pair of color, said method comprising the steps of:
calculating one or more filters from said pair of colors;
determining that the pair of colors are dissimilar if at least one of the calculated filters is above a threshold predetermined for each filter;
otherwise, calculating the CIEDE2000 color-difference $\Delta E_{00}$ and determining that the pair of colors are dissimilar if the calculated CIEDE2000 color-difference $\Delta E_{00}$ is above a predetermined $\Delta E_{00}$ threshold;
otherwise, determining that the pair of colors are similar.

In an embodiment, the one or more filters comprise a module filter wherein the calculation of said filter comprises calculating the module of the difference vector between the first and second colors represented as 3D coordinates in the RGB color space.

In an embodiment, the one or more filters comprise an angle filter wherein the calculation of said filter comprises calculating the angle between the two vectors of the first and second colors represented as 3D coordinates in the RGB color space.

In an embodiment, the one or more filters comprise a lightness filter wherein the calculation of said filter comprises calculating the lightness difference between the first and second colors, in particular the lightness difference between the first and second colors in the CIELAB color space.

In an embodiment, the one or more filters comprise a module filter and an angle filter.

In an embodiment, the one or more filters comprise a module filter and an angle filter, calculated in succession, thus calculating the angle filter after calculating the module filter.

In an embodiment, the one or more filters comprise a module filter, an angle filter and a lightness filter, calculated in succession, thus calculating the lightness filter after the angle filter, and calculating the angle filter after calculating the module filter.

In an embodiment, the one or more filters comprise a module filter, an angle filter and a lightness filter, calculated in parallel.

In an embodiment, the one or more filters comprise a module filter, an angle filter and a lightness filter, calculated in parallel and the calculation of the one or more filters is interrupted when at least one of the calculated filters is above a threshold predetermined for said one filter.

In an embodiment, the threshold predetermined for each filter is pre-obtained from the $\Delta E_{00}$ threshold.

In an embodiment, the threshold predetermined for the lightness filter is pre-obtained from the $\Delta E_{00}$ threshold and a using a linear regression.

In an embodiment, the threshold predetermined for the module filter and/or the threshold predetermined for the angle filter is pre-obtained from the $\Delta E_{00}$ threshold using a machine learning algorithm, in particular using a random forest algorithm.

It is also disclosed a non-transitory storage media including program instructions for implementing a color similarity evaluation device, the program instructions including instructions executable to carry out any of the disclosed methods.

It is also disclosed a color similarity evaluation device comprising said non-transitory storage media according and a data processor arranged for executing said instructions.

It is also disclosed a color similarity evaluation device arranged to carry out the steps of any of the disclosed methods.

BRIEF DESCRIPTION OF THE DRAWINGS

The following figures provide preferred embodiments for illustrating the description and should not be seen as limiting the scope of invention.

FIG. 9: Schematic representation of the processing time for the different strategies, considering two decision thresholds (vertical lines). FIG. 9(*a*) concerns serial processing of the pixels in an image and FIG. 9(*b*) concerns the parallel processing. For example, when applying $T_{D1}$ the decision is made by module $M_1$, while for $T_{D2}$ only module $M_3$ can make a decision.

DETAILED DESCRIPTION

Figure 4:
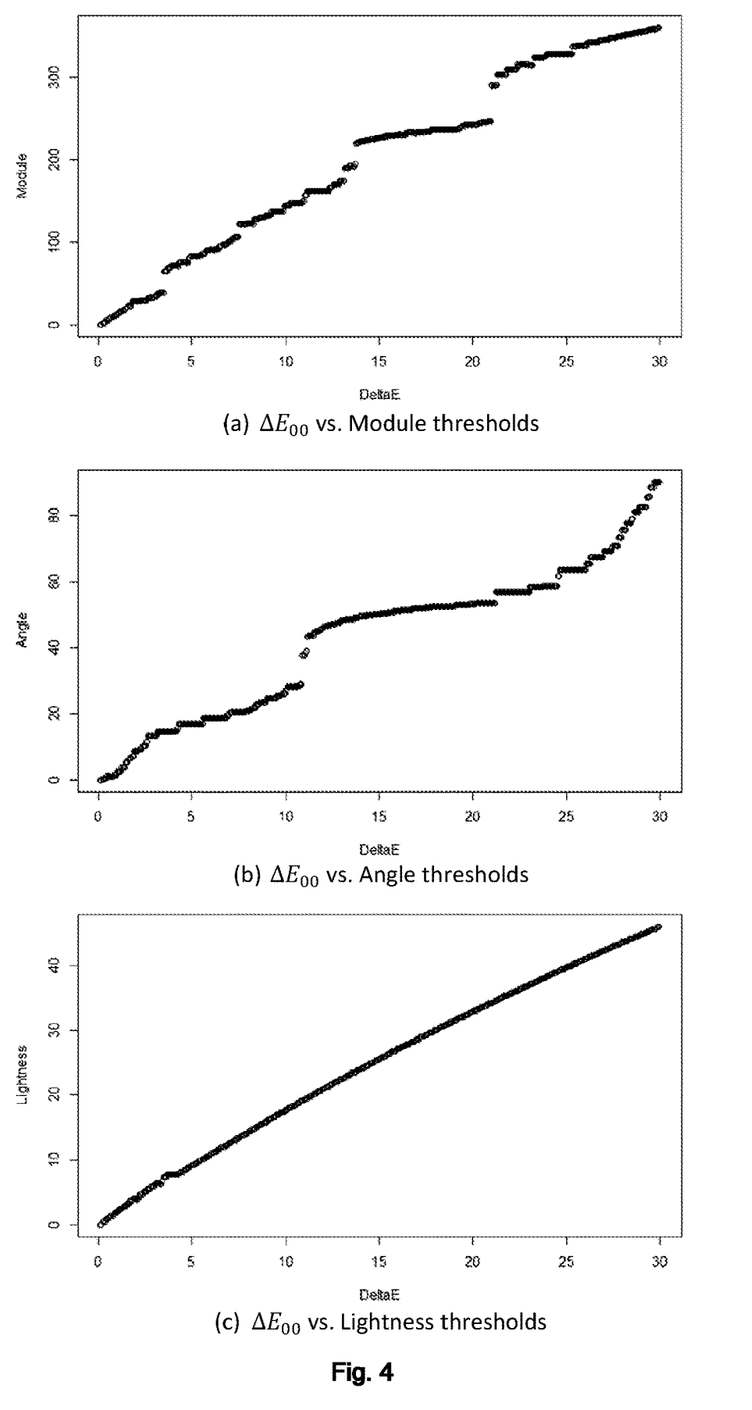
FIG. 4: Schematic representation of the Module, Angle and Lightness thresholds for each $\Delta E\_00$ threshold.

The thresholds indicated in FIGS. 1 through 3 are only valid for $\Delta E_{00}$ values of 3, 5 and 10. For other values of the metric, new thresholds may be identified. Models were derived for Module, Angle and Lightness to avoid empirical setting of these thresholds. These were obtained by training regression models using data derived from the 5 million calculated color differences. For the dataset, results and thresholds were computed for $\Delta E_{00} \in \{0,30\}$ with a step of 0.05. These values were selected because colors with 0 color difference are visibly imperceptible and with 30 are extremely different. The obtained thresholds relations are presented in FIG. 4. It is possible to observe that the relations for Module and Angle are nonlinear, but are approximately linear for Lightness. To obtain the models for the properties and validate our approach, we chose to train a random forest [2] for Module and Angle and a linear regression for Lightness. The models were trained using a cross-validation approach and the best fitting models obtained root mean square errors of 0.00675, 0.0333 and 0.00602 for Angle, Module and Lightness, respectively. Ideally these errors should be as closer to 0 as possible but, for the scope of this disclosure, the obtained errors are considered acceptable since the data used for training was already regularized.

Figure 5:
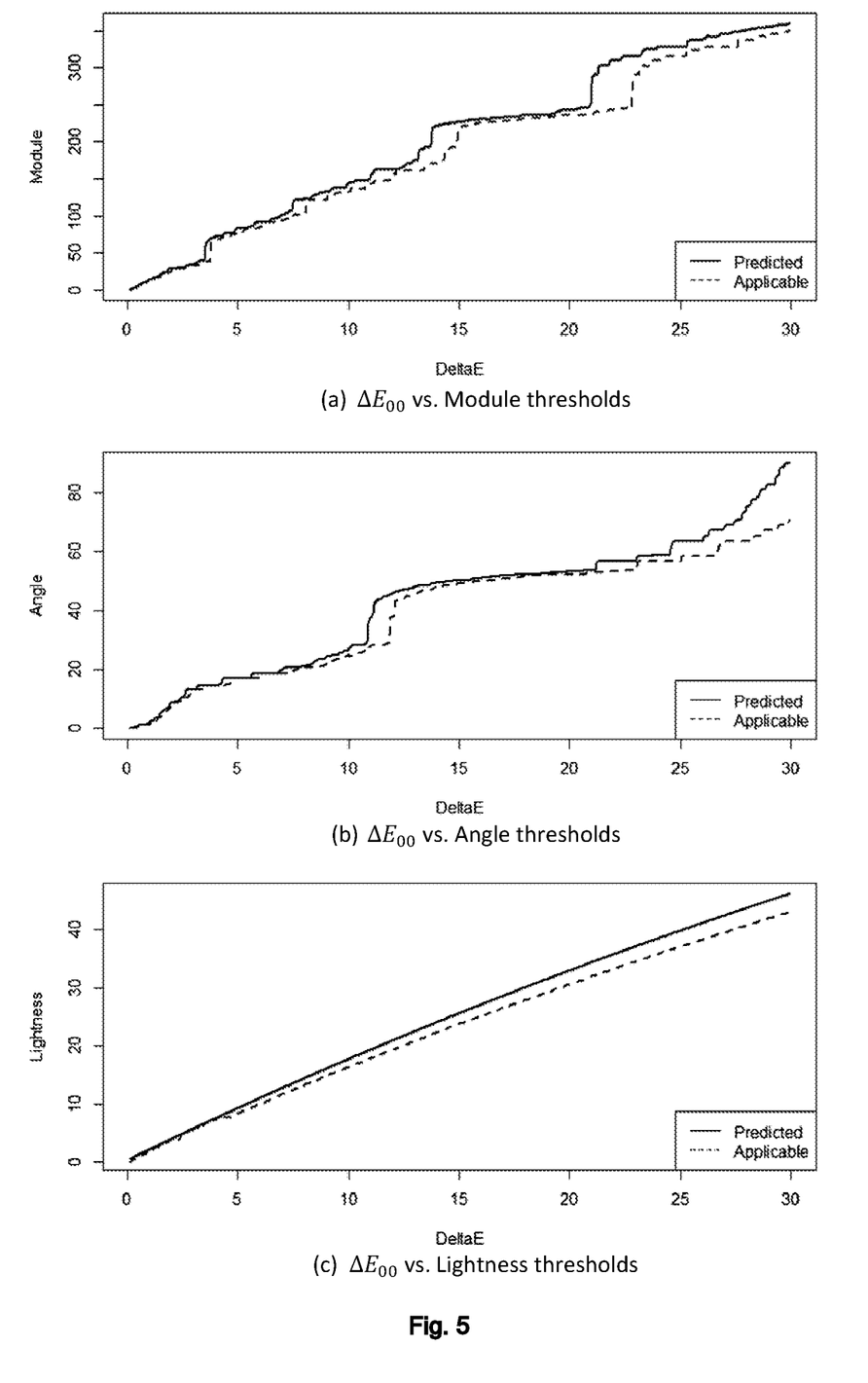
FIG. 5: Schematic representation of a comparison between optimal and predicted thresholds relation of Module, Angle and Lightness with regards to the $\Delta E_{00}$ threshold.

This regularization was introduced in the training data as to shift the predicted values so that the possible errors do not influence the final decision. While this translates into predicted thresholds different from the optimal values, it is guaranteed that they are always above the corresponding optimal values and thus always applicable. This translates into a performance deterioration, while assuring corrected predictions. Comparison of predicted thresholds using regularized and non-regularized data are shown in FIG. 5, where the black lines correspond to the regularized predicted thresholds and the dotted lines correspond to the non-regularized data. Analysing the plots it is clear that, on the universe of values studied, the predictions are always off-setted.

Figure 6:
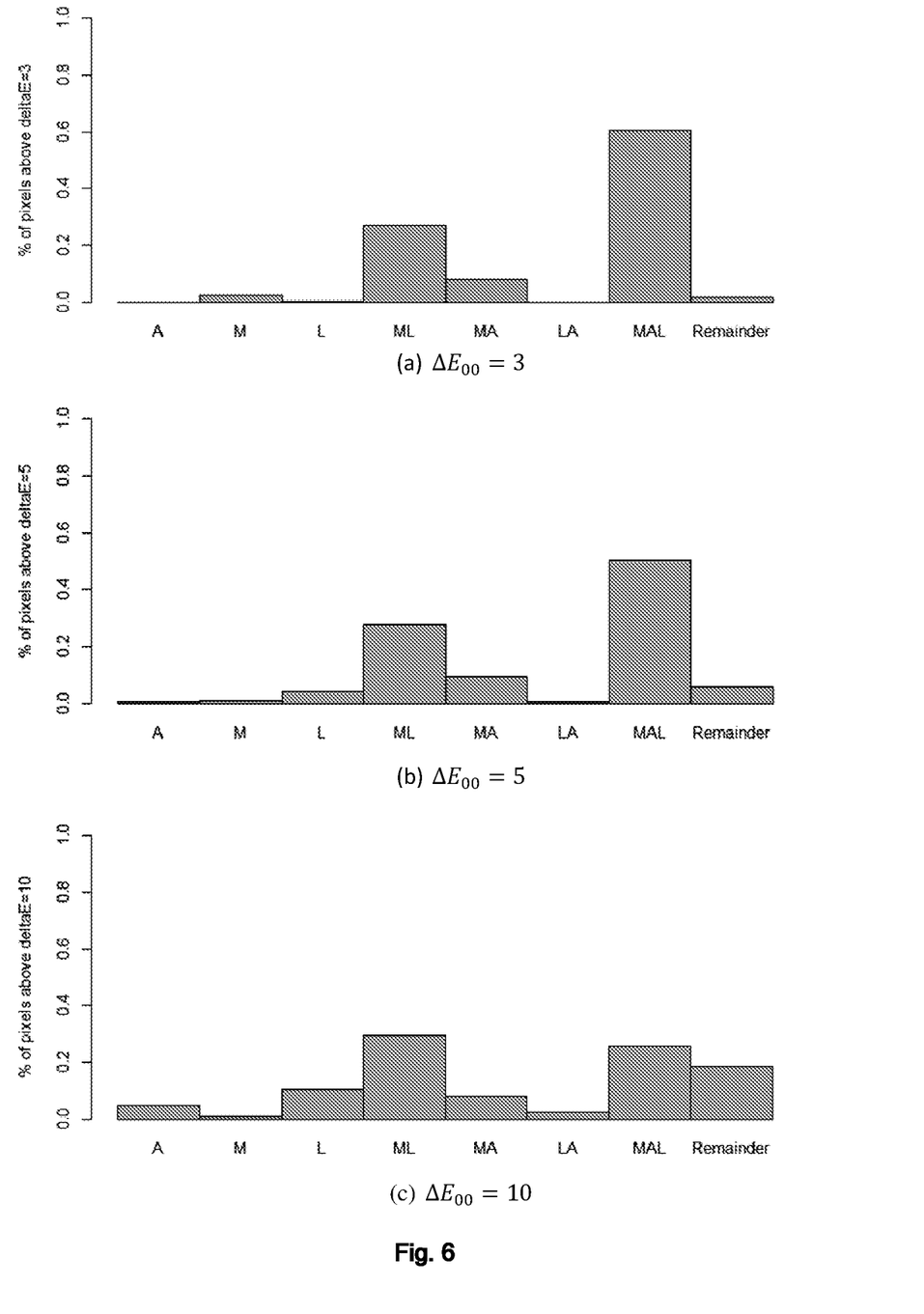
FIG. 6: Schematic representation of histogram of color differences that can by filtered by each module.

With the derived models it is possible to obtain, for any $\Delta E_{00}$ value, thresholds for Module, Angle and Lightness so that any two colors whose difference surpasses those thresholds can be classified as having a $\Delta E_{00}$ color difference higher than the specified value. This is very advantageous as it can be mapped into a structure that efficiently cuts calculations, resulting in a significant performance gain without jeopardizing $\Delta E_{00}$ properties. Each threshold can be used to reduce the amount of $\Delta E_{00}$ calculations necessary for a given application that sets a limit for $\Delta E_{00}$. However, the color combinations that each threshold cuts are not the same. FIG. 6 depicts an histogram of the number of color differences that can be filtered by each module for the three $\Delta E_{00}$ values previously considered. The histograms show that a very reduced number of color differences can be exclusively filtered exclusively by Module, Angle or Lightness. Even though this number increases with the $\Delta E_{00}$ threshold, it remains very low. It is also clear that a very large number of color differences can be filtered by combining Module, Angle or Lightness. This number varies inversely to the $\Delta E_{00}$ threshold and the decrease is compensated by the augment of the differences filtered by only two of the properties, especially Module-Lightness and Module-Angle, but also those that can be decided upon only by calculating the full $\Delta E_{00}$ metric. Hence, different strategies can be defined towards an efficient validation of whether its necessary to compute the full color difference formula or not. A set of possible embodiments is proposed and discussed below.

Based on the concepts and relations described, different strategies can be conceived towards a faster decision of color similarity based on the $\Delta E_{00}$ metric. In this section, two embodiments are put forward and discussed: (1) filtering models deployed in cascade (i.e. calculated in succession); (2) filtering models deployed in parallel. Moreover, it is discussed an embodiment applicable to large arrays of color differences to be computed, namely in image processing, where the initial proposals for color difference calculation can be used, specifically taking advantage of the widely spread multi-core hardware.

Figure 7:
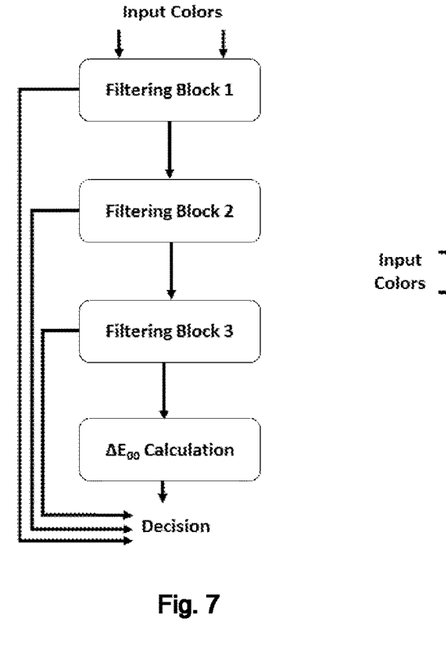
FIG. 7: Schematic representation of block diagram of the cascade embodiment.

The first proposed strategy for efficient $\Delta E_{00}$-based color decision consists of deploying the filtering modules in a cascade (i.e. calculated in succession), as illustrated in FIG. 7. In each module of the cascade, simpler calculations are performed to compute Module, Angle or Lightness and an assessment is made. The full $\Delta E_{00}$ metric is only computed as last resource; hence, it will always be the last module of the cascade.

Each module of the cascade is intended to make a decision: if colors are different then a cascade output is made; or, uncertainty exists and processing is passed to the next module of the cascade. Hence, we can expect that it is desirable to have faster modules, with smaller computation weight, executed first, preferably pruning as much pixels as possible. Nevertheless, determining the most adequate cascade structure, i.e., to identify the order of the operations, is not necessarily defined by speed of execution. It is important to note that the cascade structure may be dependent on the hardware architecture. Moreover, the value of the $\Delta E_{00}$ threshold to be considered may influence the best cascade structure. Hence, optimized embodiments are described further below.

The cascade approach aims to sequentially perform operations that prune the number of color pairs requiring the calculation of $\Delta E_{00}$. As initial blocks of the cascade are unable to decide on color dissimilarity and ultimately $\Delta E_{00}$ must be calculated, the total number of calculations would in fact be greater than just for the $\Delta E_{00}$ calculation. Hence, the benefits of the cascade strategy derive from a greater number of colors being filtered by earlier blocks.

Figure 8:
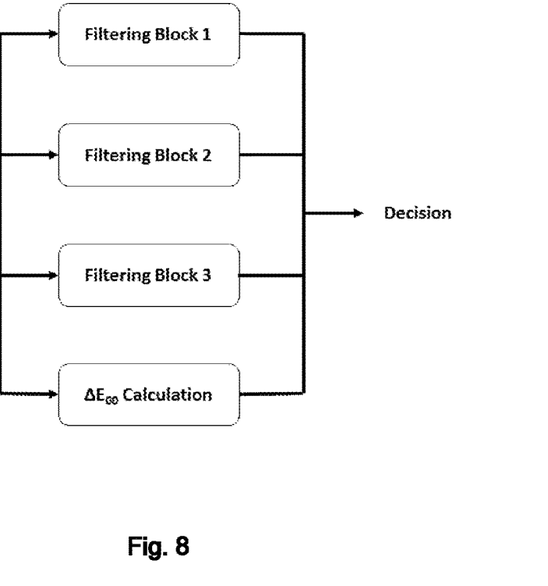
FIG. 8: Schematic representation of block diagram of the parallel embodiment.
Figure 9A:
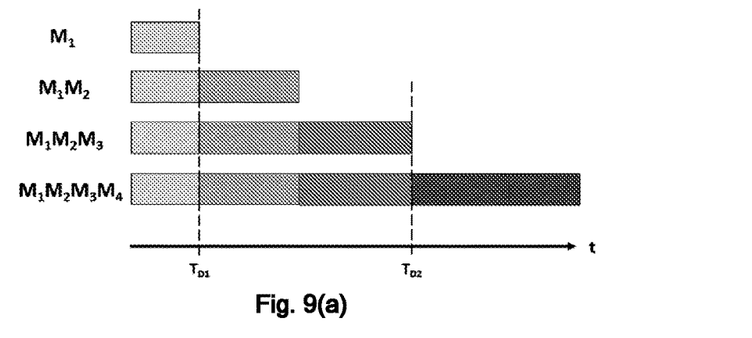
Figure 9B:
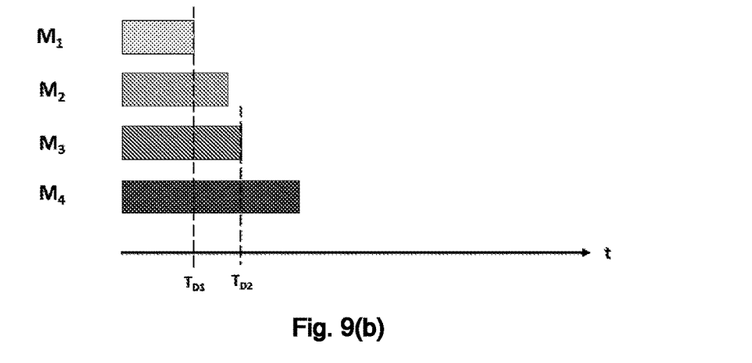

An alternative strategy to the cascade is proposed, were the different blocks are executed in parallel, as illustrated by the block diagram of FIG. 8. The underlying hypothesis is that, in this case, the maximum time for analysing a color difference does not exceed the $\Delta E_{00}$ time. While this may not be exactly true due to synchronization and management overhead, this difference can be considered almost negligible. These embodiments for the cascade and parallel cases are illustrated in FIG. 9(*a*) and FIG. 9(*b*) respectively. Obviously, the advantage of the parallel strategy is directly related to the availability of parallel execution means, e.g. the number of available CPU cores.

While this approach is sound, its implementation is not as straightforward as the cascade strategy. In fact, several implementation details must be taken into account under the penalty of jeopardizing possible gains.

The strategies described are generic for a decision on color similarity. As previously stated, the benefits of the parallel strategy are more evident when multiple core CPUs can be used and the processing distributed.

Figure 10A:
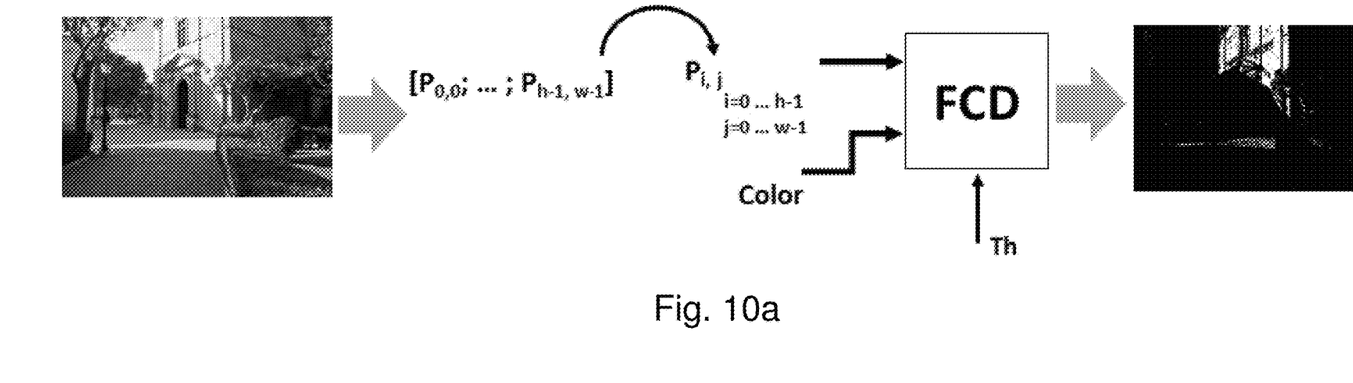
FIG. 10: Schematic representation of image processing possibilities taking advantage of CPUs with multiple cores. The Fast Color Decision (FCD) module represents one of the two proposed strategies.
Figure 10B:
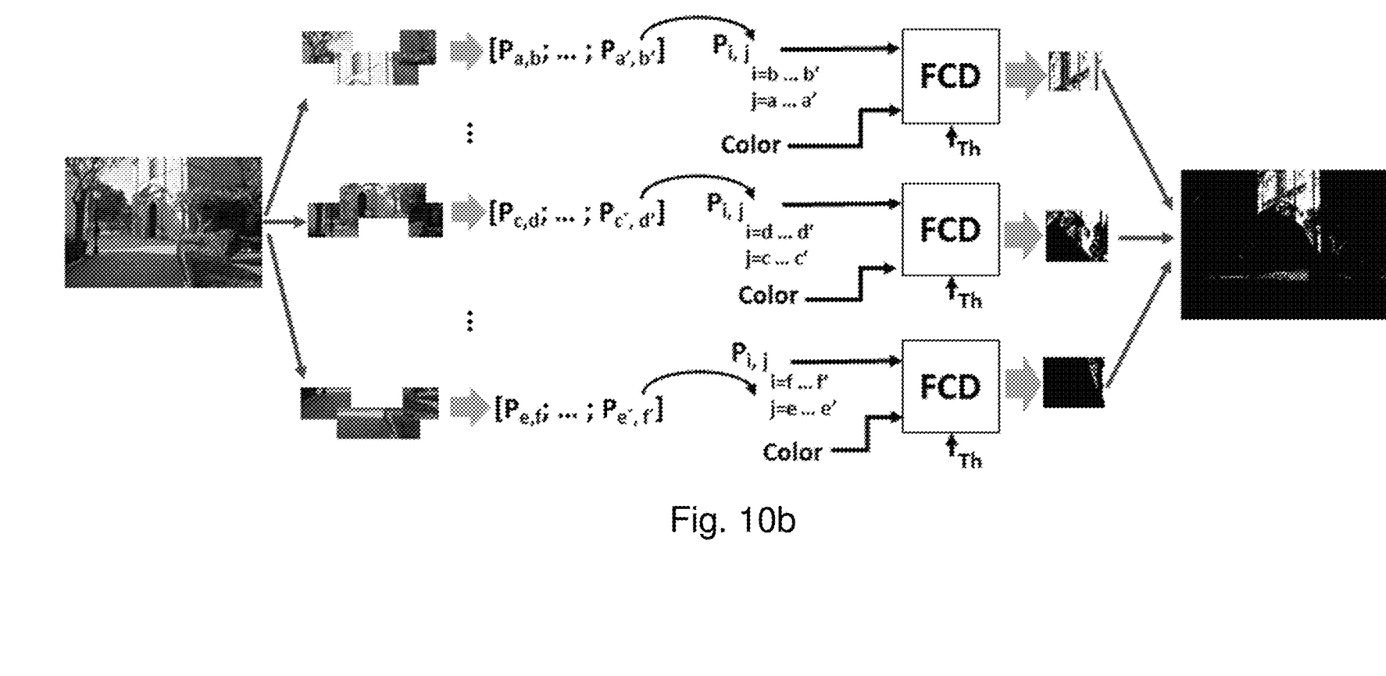

When a large array of colors, for example an image, is to be processed, i.e., compared to one or more reference colors, this data can be sequentially processed. In this case, each color would be individually and sequentially passed as input along with the reference color and the desired threshold. In other words, one pair of colors at a time. This is illustrated in FIG. 10(a). The calculation of the color difference itself could be made through any of the strategies described in the previous sub-sections. When multiple cores are available, the data to be processed can be divided and each of these blocks passed as input for processing as illustrated in FIG. 10(b).

The order of the blocks in the cascade strategy (i.e. the order in which they are calculated in succession) influences the outcome of the overall process, more specifically the time reduction that can be obtained when compared to the calculation of the $\Delta E_{00}$ metric. The $\phi E_{00}$ block will be the last of the cascade, but it is still necessary to identify what the remaining blocks should be and their order. Given the three properties put forward, there are 15 possible cascade structures as identified in Table 1. Each of these possibilities performs different pruning on the color differences. Moreover, the complexity of the cascade will depend on the restrictions imposed, namely the required $\Delta E_{00}$ decision threshold.

TABLE 1

Identification of possible cascade structures.
Even though it is not represented, the $\Delta E_{00}$ block
will always be the last module of the cascade.

| # | Order in cascade | | | ID |
|---|---|---|---|---|
| | 1 | 2 | 3 | |
| 1 | Module | X | X | M |
| 2 | Angle | X | X | A |
| 3 | Lightness | X | X | L |
| 4 | Module | Angle | X | MA |
| 5 | Module | Lightness | X | ML |
| 6 | Angle | Module | X | AM |
| 7 | Angle | Lightness | X | AL |
| 8 | Lightness | Angle | X | LA |
| 9 | Lightness | Module | X | LM |
| 10 | Module | Angle | Lightness | MAL |
| 11 | Module | Lightness | Angle | MLA |
| 12 | Angle | Lightness | Module | ALM |
| 13 | Angle | Module | Lightness | AML |
| 14 | Lightness | Module | Angle | LMA |
| 15 | Lightness | Angle | Module | LAM |

To evaluate the cascade possibilities we implemented a simple segmentation algorithm that, given an image, a color and a $\Delta E_{00}$ threshold, produces a new image that highlights regions where the colors are bellow the specified threshold. Each structure was assessed using a bank of generic colors as specified in [5] and images from the Caltech 256 dataset [1]. A subset of 4K resolution images from the RAISE dataset [6] and a small set of 8K computer generated images were also used. Each instance of the color bank was compared with the color of each pixel of the images of the three subsets. Moreover, the evaluation was performed in three different computer architectures to understand the impact over the cascade structure. Specifically, the following architectures were used: (1) a desktop computer equipped with an Intel i7 4471 processor @ 3.5 Ghz; (2) a Raspberry Pi 2 Model B; (3) a Samsung Galaxy S6 smartphone. The algorithms were implemented in C++ for the first two environments and in Java for the smartphone. In these experiments no explicit GPU acceleration was used and the CPU time and cycles allocated the process were measured.

The results presented in Table 2 clearly show the advantage of the cascade approach in alternative to the full computation of the $\Delta E_{00}$ formula for a desktop computer. Independently of the filtering blocks—Module, Angle or Luminance—their order and the underlying $\Delta E_{00}$ threshold, the cascade strategy always achieved significant gains in performance. This is true when measuring processing time as well as CPU cycles. Since there is a clear relation between the number of CPU cycles and the overall processing time, in the following results CPU cycles will only be presented when justified to convey additional information.

The increase of the $\Delta E_{00}$ threshold implies some changes in the ranking and the overall gain decreases. Nevertheless, the time reductions enabled by the cascade strategy remain very significant (above 70%) and the results show a consistency of the cascade structure. Even though there are some changes in the ranking, namely LMA-LAM and M-ML, the differences in the relative gain are almost negligible. The results show that overall greater gains are achieved when Module is the first bock of the cascade. This is consistent with the fact that: (1) it is a lightweight operation; (2) it does not require a color conversion; (3) it enables the filtering of a large number of color differences as can be observed in FIG. 1. This is particularly true for a $\Delta E_{00}$ threshold of 3 (Table 2) where the best results were obtained for a cascade with only the Module filtering block. While Module as a filtering block provides by itself large computation gains, overall better results were obtained by adding other blocks; this is due to the simplicity of the formulas when compared to $\Delta E_{00}$ and is indicative of some filtering complementarity between Module, Angle and Luminance as shown by the histograms in FIG. 6. As expected, the use of Luminance as the first block results in smaller temporal gains, namely due to the more complex formulation (when compared to Module and Angle) and the need for a color space conversion. It is also interesting to note that the larger gain is obtain with the combination Module-Angle; the addition of Luminance as the third block results in a slightly smaller gain.

The results of the experiments on a Raspberry Pi 2 Model B are consistent with the results obtained in a desktop computer, with relative gains of the same order, despite the more limited resources. Also, as with the desktop computer, there are some modification in the ranking of the cascade structure that are due to almost negligible differences in the relative gain. It is noteworthy the fact that, as in the desktop case, Module has a high impact and for $\Delta E_{00}=3$ it provides the best result by itself.

The rankings for Android present some differences with regards to the previous cases, especially with desktop, with the ranking starting with MA being followed by AM, M or AML, or starting with AML and being followed by MAL, AM, etc. Nevertheless, the gains are very significant and only slightly lower (between 65% and 89%) than in the previous cases. To this undoubtedly contributes the differences in the computer architectures, but also the requirements imposed on the implementation languages. For desktop and Raspberry the blocks were implemented in C++ and for Android, Java was used.

TABLE 2

Cascade performance on a desktop computer for a $\Delta E_{00} = 3$ for the Caltech 256 dataset. Results are ordered inversely to their computation cost.

$\Delta E_{00} = 3$

| Cascade Structure | Time (sec) | CPU Cycles | Time Reduction | Cycles Reduction |
|---|---|---|---|---|
| $\Delta E_{00}$ | 2121.82 | 7.427E+12 | — | — |
| L | 1319.91 | 4.617E+12 | −37.79% | −37.83% |
| LA | 1166.08 | 4.080E+12 | −45.04% | −45.07% |
| LAM | 1134.08 | 3.967E+12 | −46.55% | −46.58% |
| LM | 1129.93 | 3.953E+12 | −46.75% | −46.77% |
| LMA | 1129.67 | 3.952E+12 | −46.76% | −46.78% |
| A | 712.254 | 2.492E+12 | −66.43% | −66.45% |
| AL | 462.746 | 1.619E+12 | −78.19% | −78.20% |
| AML | 429.642 | 1.503E+12 | −79.75% | −79.76% |
| ALM | 98.578 | 3.450E+11 | −95.35% | −95.35% |
| AM | 87.064 | 3.047E+11 | −95.90% | −95.90% |
| MAL | 58.111 | 2.034E+11 | −97.26% | −97.26% |
| MLA | 58.094 | 2.034E+11 | −97.26% | −97.26% |
| ML | 57.502 | 2.014E+11 | −97.29% | −97.29% |
| MA | 46.706 | 1.634E+11 | −97.80% | −97.80% |
| M | 45.911 | 1.607E+11 | −97.84% | −97.84% |

The proposed embodiments enabled very significant gains in all the hardware platforms used. Slightly lower gains were obtain when using Android, to which are not agnostic not only the platform differences, but also the implementation language itself. Nevertheless, the differences in the relative gain are minimal. Even though the gains have a dependence on the desired decision boundary on the result of $\Delta E_{00}$, they are very high for useful values of the metric; larger values of $\Delta E_{00}$ will have decreasingly lower entropy with values greater than 7 considered to represent two very different colors.

The best structure for the cascade strategy presented slight variations, but overall a small set of possibilities can be identified, to be used horizontally with very small decreases in the relative gain. Specifically, for execution on a desktop computer, it is possible to identify the structure comprised of the filtering blocks Module-Angle followed by the $\Delta E_{00}$ calculation block as providing the best results or just slightly bellow. These same conclusions can be applied to the Raspberry Pi and Smartphone cases. As previously, the structure comprised of the filtering blocks Module-Angle followed by the $\Delta E_{00}$ block can be identified as a good compromise for a structure that can be applied independently of the range of target $\Delta E_{00}$ values. For these two cases, the identified cascade structure does not only provide the best result more often, but the differences are nevertheless very small.

While values of $\Delta E_{00}$ above 10 are not considered, it should be noted that colors with $\Delta E_{00}$ distance above this value are considered to be notably different. Nevertheless, the knowledge resulting from the reported analysis and proposed models (see FIG. 4) enables the implementation of the cascade in a way that it can adapt it self to different decision thresholds and hardware platforms known a priori and given a context passed as input.

The filtering properties analysed—Module, Angle and Lightness—enabled very high processing gains using different strategies and hardware platforms. Nevertheless, other properties can be analysed and their benefits studied.

Moreover, it is possible to use a hybrid strategy combining the cascade and parallel strategy.

The term "comprising" whenever used in this document is intended to indicate the presence of stated features, integers, steps, components, but not to preclude the presence or addition of one or more other features, integers, steps, components or groups thereof. Flow diagrams of particular embodiments of the presently disclosed methods are depicted in figures. The flow diagrams do not depict any particular means, rather the flow diagrams illustrate the functional information one of ordinary skill in the art requires to perform said methods required in accordance with the present disclosure. It will be appreciated by those of ordinary skill in the art that unless otherwise indicated herein, the particular sequence of steps described is illustrative only and can be varied without departing from the disclosure. Thus, unless otherwise stated the steps described are so unordered meaning that, when possible, the steps can be performed in any convenient or desirable order.

It is to be appreciated that certain embodiments of the disclosure as described herein may be incorporated as code (e.g., a software algorithm or program) residing in firmware and/or on computer useable medium having control logic for enabling execution on a computer system having a computer processor, such as any of the servers described herein. Such a computer system typically includes memory storage configured to provide output from execution of the code which configures a processor in accordance with the execution. The code can be arranged as firmware or software, and can be organized as a set of modules, including the various modules and algorithms described herein, such as discrete code modules, function calls, procedure calls or objects in an object-oriented programming environment. If implemented using modules, the code can comprise a single module or a plurality of modules that operate in cooperation with one another to configure the machine in which it is executed to perform the associated functions, as described herein.

The disclosure should not be seen in any way restricted to the embodiments described and a person with ordinary skill in the art will foresee many possibilities to modifications thereof. The above described embodiments are combinable. The following claims further set out particular embodiments of the disclosure.

The invention claimed is:

1. A method for color similarity evaluation between a first color and a second color, comprising the steps of:
    calculating one or more filters over said first and second colors;
    determining that the first and second colors are dissimilar if at least one of the one or more calculated filters is above a threshold predetermined for each of the one or more calculated filters;
    otherwise, calculating the CIEDE2000 color-difference $\Delta E_{00}$ and determining that the first and second colors are dissimilar if the calculated CIEDE2000 color-difference $\Delta E_{00}$ is above a predetermined $\Delta E_{00}$ threshold; and
    otherwise, determining that the first and second colors are similar,
    wherein the one or more filters comprise a modulus filter, wherein the calculation of said filter comprises calculating the modulus of the difference vector between the first and second colors represented as 3D coordinates in the RGB color space.

2. The method according to claim 1, wherein the one or more filters comprise the modulus filter and an angle filter.

3. The method according to claim 1, wherein the one or more filters comprise the modulus filter and an angle filter, calculated in succession, thereby calculating the angle filter after calculating the modulus filter.

4. The method according to claim 1, wherein the one or more filters comprise the modulus filter, an angle filter and a lightness filter, calculated in succession, thereby calculating the lightness filter after the angle filter, and calculating the angle filter after calculating the modulus filter.

5. The method according to claim 1, wherein the one or more filters comprise the modulus filter, an angle filter and a lightness filter, calculated in parallel.

6. The method according to claim 1, wherein the one or more filters comprise the modulus filter, an angle filter and a lightness filter, calculated in parallel, such that the calculating of the one or more filters is interrupted when one of the calculated filters is above a threshold predetermined for said one filter.

7. The method according to claim 1, wherein the threshold predetermined for each filter is pre-obtained from the $\Delta E_{00}$ threshold.

8. The method according to claim 7, wherein the one or more filters comprise a lightness filter, and the threshold predetermined for the lightness filter is pre-obtained from the $\Delta E_{00}$ threshold using a linear regression.

9. The method according to claim 7, wherein the one or more filters comprise an angle filter, and the threshold predetermined for the modulus filter and/or the threshold predetermined for the angle filter is pre-obtained from the $\Delta E_{00}$ threshold using a machine learning algorithm.

10. The method according to claim 1, further comprising splitting the color data to be evaluated in two or more data sets and evaluating in parallel said split data sets for color similarity.

11. A method for color similarity evaluation between a first color and a second color, comprising the steps of:
    calculating one or more filters over said first and second colors;
    determining that the first and second colors are dissimilar if at least one of the one or more calculated filters is above a threshold predetermined for each of the one or more calculated filters;
    otherwise, calculating the CIEDE2000 color-difference $\Delta E_{00}$ and determining that the first and second colors are dissimilar if the calculated CIEDE2000 color-difference $\Delta E_{00}$ is above a predetermined $\Delta E_{00}$ threshold; and
    otherwise, determining that the first and second colors are similar,
    wherein the one or more filters comprise an angle filter and wherein the calculation of said filter comprises calculating the angle between the two vectors of the first and second colors represented as 3D coordinates in the RGB color space.

12. The method according to claim 11, wherein the threshold predetermined for each filter is pre-obtained from the $\Delta E_{00}$ threshold.

13. The method according to claim 12, wherein the one or more filters comprise a lightness filter, and the threshold predetermined for the lightness filter is pre-obtained from the $\Delta E_{00}$ threshold using a linear regression.

14. The method according to claim 12, wherein the one or more filters comprise a modulus filter, and the threshold predetermined for the modulus filter is pre-obtained from the $\Delta E_{00}$ threshold using a machine learning algorithm.

15. The method according to claim 12, wherein the threshold predetermined for the angle filter is pre-obtained from the $\Delta E_{00}$ threshold using a machine learning algorithm.

16. A method for color similarity evaluation between a first color and a second color, comprising the steps of:
    calculating one or more filters over said first and second colors;
    determining that the first and second colors are dissimilar if at least one of the one or more calculated filters is above a threshold predetermined for each of the one or more calculated filters;
    otherwise, calculating the CIEDE2000 color-difference $\Delta E_{00}$ and determining that the first and second colors are dissimilar if the calculated CIEDE2000 color-difference $\Delta E_{00}$ is above a predetermined $\Delta E_{00}$ threshold; and
    otherwise, determining that the first and second colors are similar, wherein the one or more filters comprise a lightness filter and wherein the calculation of said filter comprises calculating the lightness difference between the first and second colors.

17. The method according to claim 16, wherein the threshold predetermined for each filter is pre-obtained from the $\Delta E_{00}$ threshold.

18. The method according to claim 17, wherein the threshold predetermined for the lightness filter is pre-obtained from the $\Delta E_{00}$ threshold using a linear regression.

19. The method according to claim 17, wherein the one or more filters comprise a modulus filter, and the threshold predetermined for the modulus filter is pre-obtained from the $\Delta E_{00}$ threshold using a machine learning algorithm.

20. The method according to claim 17, wherein the one or more filters comprise an angle filter, and the threshold predetermined for the angle filter is pre-obtained from the $\Delta E_{00}$ threshold using a machine learning algorithm.

* * * * *